United States Patent Office 3,450,547
Patented June 17, 1969

3,450,547
EXPANDED SILICATE PARTICLES
Robert H. Sams, Aldan, and Newton W. McCready, Newtown Square, Pa., assignors to Philadelphia Quartz Company, Independence Square, Philadelphia, Pa., a corporation of Pennsylvania
No Drawing. Filed Apr. 5, 1966, Ser. No. 540,211
Int. Cl. C04b 35/16
U.S. Cl. 106—75     9 Claims

ABSTRACT OF THE DISCLOSURE

Expanded particles of sodium silicate having a density between about 9 and 10 lbs./ft.³ and a compression resistance 40 to 60 times greater than previous expanded particles of sodium silicate are formed by heating a mixture of sodium silicate, soluble silica and asbestos fibers below about 250° C., forming particles and expanding said particles by intumescence.

PRIOR ART

The property of hydrated alkali silicate solids to expand many times in volume and solidify in a forameniferous form is well known and has been employed in many patents. The use of these expanded products for nonflammable fire-resistant insulation for heat and sound as well as translucent fire-resistant decoration is also widely known but, because these products are attacked by moisture, are exceedingly friable and exhibit low resistance to compression in their extended state, they have failed to attain the commercial acceptance generally expected of them.

It also has been well known to add fillers of silica, silicates, and other non-reactive as well as reactive powders, and especially to add varying proportions of inorganic fibers to improve the physical properties of the expanded intumesced product. The fillers are denser than the final product and do not expand, resulting in a residue of higher density and lower insulating value. Asbestos fibers have been used over a very wide range of concentration to thicken the plastic alkali silicate and strengthen the final product, which they do, but we have found they may also interfere with the expansion of the silicate. Further, it is well known to control the water content below about 20% before the intumescence is brought about.

In particular, sodium silicates containing a reactive silica such as diatomite form an expanded silicate having a somewhat higher silica to alkali ratio. In other cases hollow glass spheres of soluble silicate containing an insolubilizing agent, such as borate, have been formed by adding a blowing agent.

In a number of cases silicon metal has been added to mixtures of sodium silicate and sand or other additives to form a bonded cement structure and sodium silicate has been used to cement hollow glass spheres into a solid mass and expanded silicate particles have been embedded in a binder.

Thus the prior art is exceedingly complex, and examples of almost any conceivable additives can be found. It is therefore surprising that we have been able to make an outstanding improvement over intumesced particles previously known by our discovery of a complex composition not previously disclosed.

While most of these additives have also been used in continuous layers of intumesced silicate, it is recognized that the properties required in a composition for forming isolated particles are different primarily because of the difference in the necessary heat treatment and the void characteristics.

OUR INVENTION

We have now found that the ordinary soluble silicates of commerce, even those with the highest available ratio, i.e. 3.3 to 3.8 $SiO_2$ to $Na_2O$, do not permit development of intumesced particles of the highest quality. When dried to about 10 to 15% water at these high ratios, the colloidal soluble silicates do not intumesce to a large volume with high insulating value. However, we have found that if we use a commercial soluble silicate with a ratio of about 2.0 to 3.2, excellent intumescence is obtained. The initial particles expand 30 to 100 times and may have a thermal conductivity of about 0.029 B.t.u./in.-° F., but the expanded particles are weak and friable and readily weathered. We have now found, however, that if we add an amorphous form of silica which is capable of largely dissolving in the soluble silicate leaving it translucent, we can not only readily mix in the alkali silicate a carefully restricted amount of asbestos fibers which will permit the optimum expansion on intumescence, but can also retain said optimum expansion and the soluble silica will apparently become dissolved in the final stages forming what is effectively a high ratio alkali silicate in the range of 3.5 to 5.0 and thereby will be much more resistant to solution and weathering.

Our final product is formed from about 100 to 150 parts of combined alkali metal silicate and amorphous silica in such proportions as are required, in the case of sodium silicates, for a final ratio of 3.5 to 5.0 $SiO_2:Na_2O$ (preferably about a ratio of 4.0), and 1.5 to 3 parts (preferably about 2 parts) of asbestos fibers. A larger amount of asbestos fibers will retard or inhibit the expansion by intumescence and a smaller amount will not strengthen the fibers 40 or 50 times that of the unimproved product.

The initial mixture is heated to dissolve at least part of the silica without extensive or appreciable moisture loss, at about 95° C. for several hours or by forced heating at about 250° C. for one hour, or by other comparable time and temperature conditions. This semi-translucent material is broken up and we prefer to use the 8 to 10 mesh fraction for intumescence as the final product is more readily handled. However, any convenient particle size may be chosen such as 4 to 65 M. These particles are heated individually to a rather high temperature of about 400° C., or higher. This may be done by allowing them to fall individually on a hotplate or by other means well-known in the art. Our product will have an apparent tamped density of about 9 to 10 lbs./cu. ft. and a compression resistance of about 40–50 p.s.i. That is about 40 to 50 times the strength of the original unimproved intumesced particles of alkali silicate.

These individual particles may be used directly as insulation, for instance, by pouring them into a prepared space. They are strong enough and tough enough to stand shoveling and pouring without fracturing, and also will not crush under their own weight in ordinary walls, etc., as has occurred with earlier products.

The higher effective ratio also increases the water resistance to such an extent that these stronger, tougher particles may be used as light-weight aggregate for cements, for instance.

It is often desirable to prepare such insulation in a form which may be handled and still retain its exact form and shape. We therefore include in our invention the bonding of these particles with additional soluble silicate. We have found that the use of ordinary commercial silicates is unsatisfactory as it is difficult to form and dry the particles bound in this way without deterioration of the particles and subsequent increase in density and loss of insulation value.

We have found that a binder consisting, for example, of a commercial sodium silicate having a ratio of about 3.2 to 4.0 when used with the addition of about 2% asbestos fibers will permit the intumesced particles to be wetted, formed, and dried even at temperatures of 110° C. without increasing the density unduly and the product may have a density of about 9 lbs./cu. ft. and an increased compression resistance of 60 p.s.i. or more.

We have further found that when we include in the binder additionally 0.1 to 0.3% of silicon metal or ferrosilicon alloy in finely divided condition, such as 100 to 400 M (preferably 325 mesh X down), the final product will still have a density of about 9 lbs./cu. ft. but the compression resistance will be further increased to about 100–110 p.s.i. or higher, even though there may be no evidence of any voids by reaction between the silicon and the alkali silicate which is known to react with the formation of additional alkali silicate and hydrogen gas and tends to expand the film.

We are aware, further, that the properties of our product may be improved by the addition of borates and phosphates soluble in the alkali silicate. These are expected to toughen and strengthen dried films of such alkali silicates. Judicious use of other reactive fillers, such as zinc oxide and dolomite, may be included to increase weather resistance but any reaction which results in a silica gel will lower the strength of the final structure. Various silicone coatings are also applicable.

EXAMPLES

The materials used in the following examples are described as follows.

The soluble silicates obtained from the Philadelphia Quartz Company had the following characteristics:

G—a spray dried product having approximately 19.5% $Na_2O$, 63.0% $SiO_2$ and 17.5% water, with an apparent density of 55 lbs./cu. ft. and a particle size approximately 100 mesh.

RU—a liquid sodium silicate having a ratio of 2.4 $SiO_2$ to $Na_2O$ by weight, about 13.85% of $Na_2O$, and a viscosity of about 21 poises.

N—a sodium silicate having a ratio of 3.22 $SiO_2/Na_2O$ by weight with about 8.9% of $Na_2O$ and a viscosity of about 1.8 poises.

O—a sodium silicate having the same ratio as N but with about 9.2% $Na_2O$ and a viscosity of about 4 poises.

S–35—a sodium silicate having a ratio of 3.75 $SiO_2/Na_2O$ with about 6.75% $Na_2O$ and a viscosity of about 2.2 poises.

Diatomaceous earth was Celite #503 obtained from Johns-Manville. The asbestos fibers were acid-washed Powinco Asbestos Fiber obtained from Arthur H. Thomas Co. The silicon powder was a finely divided product obtained from Electrometallurgical Co.

EXAMPLE 1

(a) The fine, white powder, G sodium silicate, was sprinkled onto an inclined heated metal surface so that the individual particles expanded and were collected at the bottom of the inclined heated metal. This collected soft, white powder had a density of 5 lbs./cu. ft. and, when tested with a Thwing-Albert Tensile Tester using a plunger having a surface area of 2 sq. in., was found to have a resistance to compression of only 1 p.s.i. when the plunger was forced to a depth of 0.4 inch in an original depth of 1.5 inches. A typical polystyrene foam has a density of about 2 lbs./cu. ft. but it has a compression resistance of about 45 p.s.i. when tested the same way.

(b) Even when the G silicate was reduced in moisture content to 10% and expanded by said heating in the same way to a product having a density of 7.4 lbs./cu. ft. the resistance to compression was not appreciably increased. Furthermore, the very finely divided spray-dried G sodium silicate results in particles which are too small to have the highest utility.

(c) Twenty-two parts by weight of Celite #503 diatomaceous earth were dispersed in 100 parts of RU sodium silicate. The overall ratio of the composition was 4 $SiO_2$ to 1 $Na_2O$. This was heated with minor loss of water at 95° C. in the oven overnight and cooled and crushed. A fraction of 8 to 10 mesh was separated and these particles were heated suddenly as before. The best product was produced by drying to 11.5% of $H_2O$. However, on rapid heating in the usual way the particles were practically as light weight and fragile as the original expanded granules without the addition of the diatomaceous earth. Even granules of this type expanded to half the full diameter were almost as fragile as those completely expanded.

(d) When sufficient diatomaceous earth was added to raise the ratio to 6 $SiO_2$:1 $Na_2O$ the product did not expand when heated suddenly. When 10% of the weight of the silicate was added as asbestos the expansion on heating was restrained to practically nothing.

EXAMPLE 2

However, using the mixture of 100 parts of RU sodium silicate, 10 parts of water, 22 parts of Celite #503 diatomaceous earth, and 2 parts of asbestos fiber; allowing the mass to react at 95° C. without evaporation for 10 or 12 hours, cooling, crumbling and screening; particle fractions of 4 to 8 mesh, 8 to 19 mesh, and 10 to 14 mesh, all expanded to porous spheres with densities ranging from 8.5 lbs./cu. ft. for the 12 and 14 in. mesh particles to 10 lbs./cu. ft. for the 4 to 8 mesh particles which had expanded to ¼ inch diameter. The larger spheres were the stronger individually but when tested under compression as a mass of loose spheres the smaller spheres were more resistant. Therefore, the fraction from 8 to 10 mesh was preferred. It had a density of 9.6 lbs./cu. ft. and compression resistance of about 60 p.s.i. whereas the 10 to 14 mesh fraction produced only 40 p.s.i.

EXAMPLE 3

100 parts of RU sodium silicate was mixed with 22 parts of Celite #503 diatomaceous earth and 2 parts of acid washed asbestos fiber. This formed a paste which was heated for 2 hours at about 250° F. under pressure to avoid loss of water. After the reaction period the product was cooled and crushed and the 8 to 10 mesh and 4 to 35 mesh fractions were expanded by heating on a hot metal surface as before.

These puffed silicate beads were bonded together into a mold. It the beads were coated with straight sodium silicate, such as O 3.2 $SiO_2$:$Na_2O$ ratio sodium silicate at 42° Baumé, the liquid bonding medium tended to expand on quick-drying forming a bond much weaker than the beads themselves. When the beads were wetted with the same ratio silicate at 41° Baumé and allowed to set overnight in a mold some bonding was accomplished by drying at 110° C., but if oven drying was attempted the interior of the mold became too wet and the beads dissolved and flowed together. However, if the beads were coated with a bonding solution of 90% S–35 sodium silicate diluted with 10% of water and dried at 110° C., a block of the 8–10 M fraction having a density of 9 lbs./cu. ft. was obtained with a compression resistance of about 60 lbs./sq. in. for an indentation of 0.4 inch.

This bond was improved by mixing 5 parts of silicon powder with the 90 parts of S–35 and 10 parts of water as the bonding solution, and drying as before. There was no apparent indication that the silicon particles reacted and no evidence of expansion of the bonding coating. However, the compression strength rose to 110 lbs./sq. in. for a compression of 0.4 inch. If the bonding solution had been used without heating at 110° or possibly with less water in the silicate, the bond would have expanded to fill the voids since a beaker of such composition did expand overnight.

The silicon may be added to the silicate itself or be first dispersed in water and then added to the silicate.

The presence of about 1.5 to 10% asbestos fibers in the coating solution helped prevent the silicon particles from settling into a compact, unreactive layer. With 1.5 to 3% asbestos, the film will expand.

Of course, it is recognized that other bonding media, such as waterproof resorcinol formaldehyde resins, might be used to combine the porous spheres into a block with increased resistance to water.

More or less detailed claims will be presented hereinafter and even though such claims are rather specific in nature those skilled in the art to which this invention pertains will recognize that there are obvious equivalents for specific materials recited therein. Some of these obvious equivalents are disclosed herein, other obvious equivalents will immediately occur to one skilled in the art, and still other obvious equivalents could be readily ascertained upon rather simple, routine, non-inventive experimentation. Certainly no invention would be involved in substituting one or more of such obvious equivalents for the materials specifically recited in the claims. It is intended that all such obvious equivalents be encompassed within the scope of this invention and patent grant in accordance with the well known doctrine of equivalents as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What is claimed is:

1. The process which comprises:
    (a) mixing an alkali metal silica having an $SiO_2$ ratio between about 2.0 and 3.2 with a sufficient amount of an amorphous form of silica to give an overall $SiO_2:Na_2O$ ratio of about 3.5 to 5.0,
    (b) heating the admixture of (a) to a temperature between about 95° C. and 250° C. so as to dissolve at least part of the silica without extensive or appreciable moisture loss,
    (c) admixing about 100–150 parts of the heated product of (b) with about 1.5 to 3 parts of asbestos fibers,
    (d) cooling and breaking up the product of (c) into particles within the range of about 4 to 65 mesh,
    (e) heating individual particles resulting from (d) at a temperature of at least 400° C. so as to cause intumescence of the particles, and
    (f) recovering high-strength intumesced particles having
        (1) an overall ratio of about 3.5 to 5.0 $SiO_2$ to $Na_2O$,
        (2) a density of about 9 to 10 lbs./cu. ft., and
        (3) a compression resistance of about 40 to 60 p.s.i.

2. The process of claim 1 wherein said amorphous silica is diatomaceous earth.

3. The process of claim 1 wherein the $SiO_2:Na_2O$ ratio of the final product is about 4.

4. The process of claim 1 wherein two parts of asbestos fiber are mixed with about 122 parts of the heated product of (b).

5. The process of claim 1 wherein the size of the particles heated to intumescence in step (e) is between 8 and 10 mesh.

6. High-strength intumesced particles useful as insulation material and as a light-weight aggregate composed of:
    (a) about 100 to 150 parts of sodium silicate and an amorphous silica,
    (b) about 1.5 to 3 parts of asbestos particles; and having:
        (1) an overall ratio of about 3.5 to 5.0 $SiO_2$ to $Na_2O$,
        (2) a density of about 9 to 10 lbs./cu. ft., and
        (3) a compression resistance of about 40 to 60 p.s.i.

7. An insulating block comprising the intumesced particles of claim 6 bound together with an adhesive comprising an alkali silicate having an $SiO_2:Na_2O$ ratio of about 3.5 to 4.0, said block having a density of about 9 lbs./cu. ft. and a compression resistance of about 60 p.s.i.

8. The product of claim 7 in which the binder includes about 1.5 to 10% asbestos fibers.

9. An insulating block according to claim 7 having included in the binder 0.1 to .3% of a material selected from the group consisting of silicon and a silicon alloy, the final product having a specific gravity of about 9 lbs./cu. ft. and a compression resistance of about 100–110 p.s.i.

References Cited

UNITED STATES PATENTS

| | | | |
|---|---|---|---|
| 3,150,988 | 9/1964 | Dess et al. | 106—75 |
| 3,184,371 | 5/1965 | Seidl | 106—75 |

JAMES E. POER, *Primary Examiner.*

U.S. Cl .X.R.

106—40, 85; 252—62